Patented June 30, 1936

2,046,071

UNITED STATES PATENT OFFICE 2,046,071

LIGHT WEIGHT CONCRETE AND CERAMIC AGGREGATE THEREFOR

Charles Knox Harding, Chicago, Ill.; Mabel T. Harding administratrix of Charles Knox Harding, deceased No Drawing. Application February 5, 1930, Serial No. 426,182

7 Claims. (Cl. 25—155)

My invention embraces improvements in light weight ceramic aggregate for hydraulic cement concrete structure—or similar light structures formed from said aggregate and a binding material such as clay which may be moulded into suitable shapes and refired to produce finished burned light structures for building or other purposes. My present invention relates more particularly to the various improved processes for producing efficiently and economically from readily obtainable and inexpensive raw materials, an improved ceramic aggregate, the individual units of which may if preferred be of the most desirable shape, that is a rounded or globular form and which may be partially, or to a greater or less extent hollow, having vesicles, cells and sealed gas filled bubbles, comprising their interior portions and a hard, solid, strong, spherical, non-vesiculated waterproof outer and if for use with Portland cement silica coated, shells forming an improved ceramic aggregate unit embodying the greatest mechanical strength with the least weight and which may be preformed of suitable and symmetrical sizes and that can be fired to a high temperature in a rotary kiln without clinkering or welding together and vesiculated, expanded and directly introduced into a concrete structure as finished aggregate.

Among the objects of my invention is to provide an improved light weight hydraulic cement concrete at a cost less than ordinary fireproof building materials which results from the use of the novel light weight manufactured product I have invented as the aggregate or the main constituent of said concrete. The ceramic aggregate can be produced from earth material such as may be found near the centers of population in all parts of the country, and which is composed principally of the oxides of silicon and aluminum the most plentiful of the solid chemical elements, and which ceramic aggregate may be burned with much less fuel cost than an equal volume of ordinary ceramic building material.

According to my invention a building block or unit can be produced which will for illustration take the place of twenty-four common building bricks and mortar and will weigh less than half as much and cost less to produce.

In carrying out my invention I take any suitable earth substance preferably one containing aluminum ($Al_2O_3$) and silica ($SiO_2$) in the approximate proportion twice the weight of silica to alumina or in the molecular ratio of ($Al_2O_3$) : ($SiO_2$) 3.33—this approximates the soil and common clays most generally found, red burning clays have an average of about 3% iron oxides and may generally be conveniently found with from two to three times as much iron. If this material has a fusing or softening temperature that is too high I add lime, magnesia or iron compounds or a material containing sufficient of some or all of them or other convenient ceramic fluxing and preferably gas generating material to bring the softening point of the raw batch mixture down to a desirable temperature which in most cases is approximately two thousand deg., F., and this may be done also in the cases of most aluminous earth to be met with generally.

In carrying out my invention after the desired fusing point of the batch is attained I make sure that it also contains from 5% to 6% of easily reducible compounds which liberate gaseous compounds in the presence of incandescent carbon at temperatures in the neighborhood of two thousand deg., F., and apparently without actual mechanical contact with the carbon, among such materials of a ceramic character that are not too heavy and expensive, I have found sulphate of calcium and oxides of iron and especially mixtures of both to be satisfactory for use in a ceramic batch for producing vesicular structures; for illustration, if the natural clay of the body batch contains 3% of iron oxide I only need to add about 2% of gypsum, or other insoluble compounds may be used to evolve gas and simultaneously lower the fusing point of that part of the ceramic body and react at a slightly different temperature than the iron or gypsum, or if instead of a ferruginous clay a white burning clay is used and it is desired to produce an aggregate of white or light color—the gypsum or other alkaline-earth sulphate may be used or other non-coloring compounds that will liberate gases, in the presence of heat emitted carbon ions.

In order to cause the ceramic body to expand and become vesicular I prefer to introduce and uniformly distribute through the batch mixture separate and discrete particles of carbonaceous material such as coal or coke, preferably about the size that would pass sixty mesh seive and be retained on an 80 mesh. This granular carbon is preferably introduced into part of the batch with enough water to form a thick slurry or very plastic mass and then has the balance of the drier material added and thoroughly mixed throughout the batch during the pugging and extruding operation. As a result of many experiments I have discovered the granules of considerable size produce better results than any other form of carbonaceous material, and that in one characteristic test with an expansible body batch mixture softening at 1900 deg. F. containing little as 3% ferric oxide with the addition of carbon granules the size above named and the body brought up to two thousand deg., F., in about 20 minutes it continued to expand while held at that temperature for twelve minutes, and the body was expanded to over three times its original volume. It is apparent that the vesiculating cells are caused by bubbles of gas liberated from the solid materials introduced for that purpose and not by water as disclosed in one method patented.

As the raw batch is passed through the extruding dies or briquetting rolls it is preferably formed into small balls or pellets of rounded and rollable pieces of such relatively small size as will be when fired and expanded, of suitable size to be directly introduced into a concrete structure as ceramic aggregate.

According to one of the improved processes of my invention a considerable mass or volume of the formed rounded ball like pieces which have been prepared from a suitable fusible and expansible body batch mixture containing any suitable compounds capable of evolving gases when heated to the softening or welding temperature of the ceramic body may by suitable means and methods and expedients, be fired as in a rotary kiln of the type used in the cement industry and have their interior portions subjected to heat above the welding temperature which partly fuses the bodies and generates gases by the chemical reaction therein of compounds introduced for that purpose, which gases swell, puff up and expand the partly melted body and render it light and vesicular, but without welding or centering or clinkering the individual pieces together.

For many years burned vesicular argillaceous material as embodied in coal cinders and clinkers has been well known as resulting from subjecting the incombustible earthy material of coal containing iron and sulphur compounds, together with sufficient carbon to the welding temperature and thereby forming relatively light expanded clinkers. This light vesicular material has been used as a concrete aggregate since Portland cement came into general use and its low cost vesicular character and considerable strength contribute largely to make it a desirable light concrete aggregate. I am aware that it has been proposed by one European patentee to add argillaceous material to coal and on burning to produce a larger quantity of artificial cellular clinkers which could be broken up to form light concrete aggregate. These artificially prepared clinkers could obviously be made quite cheaply and become improvement over coal cinders as heretofore known, but my invention is broadly distinguished from this in that my observations on expanded ceramic structures over several years have convinced me that the successful and economical process of burning such products must be a non-clinkering process and accomplished without welding together or materially changing the size, surface to weight ratio or heatability of the individual units of the unfired bodies as introduced into the furnace throughout the entire vesiculating and the cooling and heat conserving step and in the finished aggregate which should preferably have a highly siliceous chemically acid exterior surface to bond most effectively with the basic calcarious Portland cement.

I am also aware that another European patentee discloses an operative process by which a light cellular and considerably laminated aggregate can be made by subjecting pieces of naturally laminated shale or slate containing iron and carbonaceous material more or less disposed in certain planes or layers between other more refractory layers containing less gas evolving and flux producing iron and carbon compound to a temperature 2160° F. without clinkering the material.

My invention includes an improved and more economical and efficient process for producing a much improved light aggregate free from lamination or planes of cleavage without clinkering and is more desirable than the known clinkering process.

It is known to those familiar with their art that only those carbonaceous and ferruginous shales and coal slates which may be burned and expanded and rendered vesicular to any useful extent without clinkering are those of a sedimentary character having layers or laminæ of varying fusibility and in which both the carbonaceous matter and the iron compounds predominate in certain planes or layers alternating with more refractory laminations and while their natural combination of refractory and fusible lamination does permit the very desirable and efficient handling and burning of a large mass of relatively small pieces without the undesirable clinkering because of the refractory nature and relative infusibility of the non-vesiculatable laminations the burned and expanded product resulting from such material is unsatisfactory because some of the layers are overexpanded, weak and fragile, while the other more refractory layers hardly expand at all during the burning operation. As an example: A coal shale from northern Alabama will expand to four times its thickness in one direction and not any in the other two directions lying in the planes of the laminations.

One of the principal objects of my invention is to produce improved homogeneous non-laminated expanded vesiculated preformed ceramic bodies which may be fired in mass as in the ordinary rotary furnace or kiln processes of firing to produce the highest degree of useful vesiculation and economy without clinkering.

My non-clinkering involves the heating of homogeneous and non-laminated material above its welding or clinkering temperature and as chemical and physical changes produced by heat in a ceramic body involve the transfer of heat from the hot gaseous products of combustion to the outer surface layer of the body and the conduction of that heat, energy to the interior to produce the necessary effect in the interior of the body and while the material of the unexpanded body is a relatively poor conductor of heat the vesiculation of the outermost layer converts it at once into the state of a highly efficient heat insulator, this change which tends to fuse and melt the outer surface of the vesiculated portion before the heat has had time to penetrate into and vesiculate the central portions of the body and materially increases the difficulty met in realizing all the manifest advantage derived by the transfer of heat to small individual bodies in burning and vesiculating the bodies without clinkering This heat insulating character of a vesiculated outer surface would normally produce nodulizing sintering, welding, and clinkering of the loose individual bodies into large masses of agglomerated material which would defeat the further transference of heat so necessary in heating and cooling bodies recuperatively superheating incoming air.

And quite a number of precautions taken; expedient discovered and methods had to be devised and relied upon to enable small preformed pieces of weldable material to be completely and entirely burned and fully vesiculated and yield parts of their heat and finished without clinkering among such steps which may be employed in part or in combination in carrying out my invention the following may be enumerated,—#1—#2—#3.

1. In the manufacture of the stronger kinds of aggregate suitable for solid reinforced concrete having especially high crushing strength and for dense rich concretes weighing over 86 pounds per cubic foot, in which the rounded aggregate units are preferably provided with thick shells and which do not require their original shells to be enlarged more than 60% it has been found that when provided with a coating or suitable layer of added refractory ceramic material which can be applied to the units in any suitable manner it will enable them to be fused, and vesiculated without clinkering and be otherwise advantageous; therefore The formed rounded pieces of the prepared fusible body mixture into which has been incorporated the material to make it expand are according to one method of carrying out my invention next coated on their outer surface with a refractory relatively infusible ceramic material in the manner heretofore mentioned or otherwise in order to improve and strengthen the produce and help produce a hard strong solid and water-proof outer shell on each of the rounded pieces; this coating may be nearly pure silica or burned or raw fire clay rich in silica or other inexpensive ceramic refractory material that will not fuse or materially soften or reach its welding point during the subsequent firing operation to which it is exposed. A light diatomaceous material of silica in an allotropic reactive form is desirable for coating the smallest pieces of aggregate.

2. My non-clinkering process may be further assisted by mixing with the preformed bodies introduced into the firing and expanding chamber of the kiln small granular or finely divided refractory ceramic material such as silica and burning the mechanically agitated and rolling mixture in its passage through the hottest zone of the firing and expanding operation so that any portion of the fused vesiculative material reaching the surface of the bodies through the enlarging or opening up of portions of their shells will cohere weld onto and react chemically with and absorb the granular refractory ceramic material and render the outer layer of the bodies more refractory and thus help prevent clinkering and otherwise strengthen the aggregate and improve its bonding properties with cement and when the expanding of the aggregate is gradual and the increase in temperature in passing through the expanding zone of the kiln is not too rapid this method of adding new material to and re-building relatively small cracks and openings in the expanding surface as they gradually occur during the vesiculating operation is very effective in maintaining the bodies in non-clinkering condition and adds only about 4% to the weight of the larger size aggregate.

3. My improved non-clinkering process of producing and burning ceramic aggregate preferably utilizes a controllable change in the chemical character and physical properties of the ceramic body mixture during the firing and vesiculating operation to prevent the outer contacting surfaces of the bodies from welding together or clinkering and to otherwise improve the bodies. In my ceramic research with the commoner clays or ferruginous argils magnesium, calcium, aluminum and iron silicates I have observed that ferric di silicate ($Fe_2O_2$) corresponding to the aluminum group silicates such as kaolin $$(Al_2O_3)2(SiO_2)$$

has a somewhat similar high melting or fusing point; while ferrous silicate ($Fe_2Si_2O_6$) corresponding to the calcium group silicates such as ($Ca_2Si_2O_6$) has a similar low fusing point like the calcium silicate and that in crude clay and shale bodies having from 9 to 12% iron oxide a change in form of the ferric oxide contained would cause a corresponding change in the welding temperature of the ceramic body of three to four Seger cones. The chemical reaction involved appears to be that the group 3 ferric compound associated with the alumina ($Al_2O_3$) is probably a large or heavy slow reacting unit while the ferrous oxide may break up into (FeO) a smaller, lighter and much more reactive compound like (CaO) and forms compounds having a much lower fusing point in carrying out my non-clinkering process I have found it of great importance to take advantage of this reaction to prevent clinkering. In certain cases I can take a body rather high in iron and also with some added advantage containing magnesium and calcium compounds and preferably granular carbon in the form of coke and introduce perfectly homogeneous raw bodies of this mixture into the kiln and by maintaining an oxidizing atmosphere while the bodies were passing the drying and water smoke zones in the kiln and especially in that part with which the bodies contact while passing through a range of temperature above 1100° F. and to a greater or less extent up to a temperature of 1800° to 1900° F., according to the thickness of the unvesiculated solid shell it is desired or necessary to create on the outer layer of the more refractory materials to produce greater strength and prevent clinkering.

A layer of the carbon at the surface and of greater or less depth may be burned out and removed from the field of action before the bodies reach the temperature at which this carbon would and the carbon remaining in the interior does react with the more refractory ferric oxide and reduce it to the more fusible ferrous oxide at the time the vesiculating gases are produced and liberated by maintaining an oxidizing atmosphere in the rotating kiln and preventing contact of the flame or hot reducing gases I am thus enabled to maintain whatever iron compound the argils may contain in the form of the more refractory ferro compounds as the temperature at which the carbon of the outer shell will burn out is below the temperature at which it reduces ferric oxide in an oxidizing atmosphere ferrous sulphides will also be decomposed the sulphur compound eliminated and the iron converted to the refractory ferric form ($Fe_2O_3$) and also to a great extent at a somewhat higher temperature the ferric silicates usually present in red burning clays are converted to the more refractory ferric compounds.

In a rotary kiln more than five feet diameter, I have found with proper air control that the flame and reducing kiln atmosphere can be completely maintained in the upper two-thirds of the kiln chamber at all points outside the hottest zone and in firing small rounded and easily rollable ceramic bodies the charge passing through the kiln may be kept well within the bottom one-third of the revolving firing chamber and this oxidizing method of producing a refractory non-weldable surface and reenforcing and strengthening layer is of great advantage in the production of a partly hollow expanding ceramic unit by my non-clinkering process.

In employing this process of producing the refractory coating of the vesiculatable units which are burned by my heat conserving non-clinkering process at temperatures between 1100° and 1800° before the highest fusing and vesiculating point the oxidizing kiln atmosphere acts on ferrous compounds such as ferrous sulphide in the exterior layer of the originally homogeneous bodies and removes the vesiculating sulphur as well as the gas generating carbon therefrom so that the outer layer or shell is transformed into a much more refractory and solid and heat conducting shell which conducts heat through to the fusible vesiculatable interior without itself being fused by being raised to the relatively higher welding or clinkering temperature. In the first stages of the vesiculating operations countless microscopic cells appear distributed through the ceramic body and many remote from the smallest of the carbon granules therein, these bubbles gradually enlarge by the collection of groups of the smaller ones and the cells form around each of the carbon granules enlarge with progressive firing the cells enlarge until the smallest granules are entirely consumed, at this stage the size of the cavities do not correspond to or seem to have a definite ratio to the size of the carbon granules, being of more nearly uniform size and when about one half of the smaller granules have disappeared the empty spaces will be of various sizes seemingly corresponding to the volume of the original grains on longer firing or at a few degrees higher, the smaller bubbles begin to coalesce and form fewer and larger cells and it is possible by repeated firing of bodies having a spherical refractory shell and a more fusible body to carry on this careful refiring at least on a laboratory scale and produce ceramic structures by this process alone, having only one large cell or entirely hollow.

In the manufacture of commercial light aggregate there is a wide range of ratio between the amount of the total material best to dispose proportionally between the solid shell and the reinforcing interior web of more highly vitrified ceramic material which formed the partitions between the cells which is very high in tensile strength and it is within the knowledge of those skilled in the art to make such variations as may be determined best suited to the conditions of different uses, such as sound and heat insulating purposes as well as structural strength and elastic requirements without departing from my invention.

Besides the three methods and expedients as enumerated for carrying out my non-clinkering process, the use of graded sizes of granular carbon as specified contributes very largely to the success of the method dependent on the maintenance of a large part of the surface area of the ceramic bodies in a non-weldable condition while subjecting their more fusible interiors to a temperature above their welding degree of fusion and it is necessary to maintain their refractory coating over a major portion of the contacting exterior during the period of expansion and it was necessary to devise a means to prevent the too rapid liberation of the vesiculating gases at any one particular time and temperature. In the case of naturally occurring carbonaceous shells the more fusible and expansible layers have an excessive amount of finely divided iron and carbon most intimately mixed and as the chemical reaction between ($Fe_2O_3$) and carbon is exothermic and liberates considerable heat, and as the change in the valency of the element is definitely associated with a corresponding temperature the liberation of the oxygen atom from ferric iron compound is practically instantaneous when the critical temperature is reached to initiate the reaction and the heat liberated from this initial point of the reaction is propagated throughout the entire mass with almost explosive violence and such mixture of iron and carbon as occur in shale are not suitable for making noneliminated aggregate by a nonclinkering process and result in an overfused and relatively heavy aggregate when used as it may be in a clinkering process.

By the use of relatively large graded sizes of carbon grains distributed throughout a common clay ceramic body in which the iron compounds are distributed in almost molecular fineness I am enabled to prolong the time of expansion over a period as much as seven minutes instead of a few seconds as in the case of naturally occurring mineral mixtures, and thus very gradually raise the temperature and expand the softened vitreous body without dislocating the refractory portion of the body from the superficial outer surface. Another expedient that I have found available under conditions where it is desirable to still further prolong and stabilize the firing and vesiculating range is to employ a plurality or series of other vesiculating gas evolving compounds besides those of iron which react at separate and different temperatures; among the most desirable are compounds of magnesium and calcium and the use of a plurality of vesiculating agents is an important improvement in the light aggregate art where a non-clinkering process is employed and relatively close temperature control is required for successful operation. Successful operation in this art is closely associated with the most economical operation and the greater margin of safety and larger latitude in meeting unfavorable conditions so that the more cooperating expedients, each one of which could function alone to produce a very satisfactory result are employed in combination in an improved process for producing an improved light ceramic aggregate, the greater practical value of the combination of all the desirable steps should be set forth and claimed and stated to be the essence of my invention, the object being to produce the most desirable aggregate from the most generally available material and such production must involve the use of the most economical non-clinkering process and the various features and discoveries of my invention are relatively valuable in contributing to that result.

As the expanding of a body with an entirely refractory exterior surface to four times its volume as would often be done involves enlarging its outer surface to an extent corresponding to the second power of the cube root of four, or increasing its diameter about sixty percent and the unfused original surface is gradually cracked and opened up into relatively small areas or islands—the solid refractory sections being maintained on the outer surface by outward pressure of the inner expanding bubbles or cells. If the refractory surface of the units as in the case of my improved process is partly produced by the burning out of carbon by the kiln atmosphere and the transformation of the iron in the outer layer to refractory ceramic compound by the oxidizing kiln atmosphere besides any outer layer of any added refractory material that may have been applied the outermost transformed layer comprises more or less concentric transformed zones, the outermost being the most refractory and the inner ones more fusible and as these more refractory come to the surface of the cracks they become oxidized and more refractory and thus rebuild and maintain the fractured portions in a refractory condition. When as may happen the shells of contacting units both rupture at the contacting surface a small area of this contacting fused surface will weld together but this hot welded portion is stretched and easily broken by the rolling stirring motions of the units caused by the rotation of the kiln.

It is often desirable, however, to supplement this action in burning concrete aggregate for use with Portland cement by the method.

In the firing of and vesiculating the interior portion of raw homogeneous ceramic units it is highly desirable to provide and assist in maintaining the refractory character of the surface of the shells after the units have acquired the refractory character in their entire outer surface. It is most desirable to gradually increase the heating and also to provide by additional means for, the still more gradual vesiculation and expansion of the volume of the units and the gradual stretching of the less refractory and the opening up of the most outer and most refractory layer of the surface which increases as the two-thirds power of the increasing volume.

It is therefore of utmost importance in the burning of a contacting mass of vesiculating ceramic units that the fusing and expanding must be produced gradually and the increase of temperature be gradual at this stage of the burning process, as the sudden application of heat would cause the rupture of the entire outer refractory coating and the escape to the outer surface of the fuse interior portion and cause the old mass of units to weld together and clinker and defeat the attainment of several of the important advantages of my invention. Among them, the efficient production of light, aggregate units with a silica coating.

By conducting the vesiculating operation gradually with bodies having carbon grains of the proper size and containing sufficient iron compounds, and especially by employing a plurality of vesiculating gas evolving agents that react at differing temperatures and times and by the proper arrangement of the fuel and the air supply in a rotary kiln of sufficient diameter so that an oxidizing kiln atmosphere can be maintained in contact with the expanding units when desired.

2. By allowing as is done in one operating plant a considerable amount of the granulated sand or refractory material that was blown on to the units as they came from the extruding dies which may conveniently extrude about 600 pugs into which the refractory coating material is blown while being cut off by 24 moving cutting wires which travel transversely across the moving pugs and the considerable excess of the refractory powdered material may accompany the cut units as they pass through the ball forming plastic unit rounding and rolling coating elevating and conveying system or device and are delivered into the rotary firing kiln so that a suitable percentage as much as four to eight percent. by weight of the granular refractory material may advantageously be left in admixture with the units as they undergo the firing and vesiculating operation and it passes on and out the cooling end of the kiln with the finished aggregate units through a small automatic discharging door which opens during about one-tenth of each revolution of the kiln into a small air lock which is automatically opened at alternate intervals when not in communication with the kiln chamber and dumps each charge on a grating from the top of which the aggregate is carried by chain bucket elevator to the stock piles and the granular material from the bottom of the grating is returned to the bins at the ball forming device for re-use with additional new material.

The refractory coated pieces thus prepared may be fired in any suitable manner but are preferably fed and rolled through a long rotary kiln in which the gaseous fuel is fed into and burned at a point near the middle of the length of the kiln, or elongated chamber, and the highest temperature zone is maintained of a considerable width just ahead of and near this point. The cold material is fed into one end and a large loose mass in an open freely permeable form is progressively advanced toward and through the hottest zone and then on and out of the cooling end of the kiln. A large part of the air necessary for the complete combustion of the fuel is introduced at the cooling, discharging end and passes in contact with the freely permeable open rolling and stirring mass, and is progressively heated on its way to the point of combustion where it helps burn and completes the combustion of the fuel, thus transferring a large part of the heat units of the hot finished mass back into the kiln for providing a hot, oxidizing kiln atmosphere for performing more useful work; and thus effecting considerable economy by my non-clinkering process of burning non-clinkering aggregate. The refractory surface of which permits a large moving mass in a freely permeable state to be heated materially above the fusing or welding point of the expandable body without clinkering the mass or destroying its desirable easily heatable or coolable properties, which is only characteristic of a permeable mass composed of small loose pieces. In burning they are gradually subjected to action of heated gases of progressively higher temperatures, thus utilizing the high temperature of the products of combustion to apply to material already raised to nearly the required temperature and utilizing the heat of the thereby partly cooled gases to heat incoming material which is only a little less heated.

I have discovered that my improved aggregate makes the lightest and strongest porous concrete producible with a given amount of cement being made with a ball shaped light, coarse aggregate, the coarse aggregate having a very light interior and a relatively strong solid water-proof outer shell, the volume percentage of voids being much less for this form and the surface to volume ratio much less, and the water correspondingly required to wet the surface and produce the necessary workability and the less mechanical resistance in forcing the globular wetted surfaces into the most numerous contacts permit a much more desirable water to cement ratio and a still better crushing strength to cement percentage ratio.

And that the characteristic truncated tetrahedral shape of the voids having four concave faces permits a much less percentage of fine aggregate and cement mortar to be employed. In producing an improved new type of porous concrete of greater strength for weight than would be required if the volume of mortar that would entirely fill the said voids were employed and that a very strong and good load bearing concrete can be produced by employing only enough cement fine aggregate mortar to partially fill the voids and to cement the strong silicious shells of the coarse aggregate together at their numerous points of contact and near contact to produce a somewhat greater tensile and compression strength in the cementing and bonding mortar than is possessed by the reinforcing shells of the globular coarse aggregate in cases where it is very highly expanded and has strong solid and waterproof outer shells.

This novel porous concrete is one of the useful improvements embraced in my present invention.

In the case of denser concrete the shells may, if desired, be made thinner and the interior more expanded or hollow in one form of my improved concrete or be made thicker and stronger and less vesiculated and the voids therein entirely filled with a cement fine aggregate mortar which may be made to furnish its proportional part or a much greater part of the total strength of the concrete structure so made, to compensate for a very greatly expanded light aggregate and still produce a very desirable new type of very light and solid weather resisting concrete.

In the present known concrete art rounded pebbles of silica or silicious material is advantageously employed as coarse aggregate for concrete, the highly reactive chemically acid character of the silica surface with the basic calcarious chemical compounds which comprise Portland and other hydraulic cements make the silicious surface almost ideal while their 15 to 18 per cent greater workability due entirely to the globular or rounded form of the individual pieces enable a most favorable water to cement ratio to be employed and produce a good bonding and a very strong mortar of cement and fine aggregate, usually silicious sand to be employed but both of these desirable characteristics have more than overcome by the inherent structural defects of the silica and flinty pebbles of coarse gravel aggregate the frail, fragile, friable, frangible character of the larger pieces of silicious material in one or several of the nine allotropic forms in which masses of silicon dioxide may exist and the tendency to change from one allotropic form to another having different volume and molecular arrangement under sudden mechanical stress tensional and torsional and temperature and electrical stresses make it necessary in the best engineering practice to reinforce such concrete by the use of a great excess of cement and mortar over that required to fill the voids, and in many cases thus requires more total cement to produce a desirable concrete than if undesirably shaped angular pieces of crushed material but devoid of such silica characteristics were used as aggregate.

The use of my improved aggregate having more of all the desirable properties of natural rounded gravel and entirely free from its undesirable characteristics enables three new classes of improved light concrete structures to be produced; the porous class in which the strength of the reinforced coarse aggregate is proportional to the maximum strength of the concrete and only enough cement mortar is required to partly fill even the minimum low percentage of voids characteristic of rounded globular aggregate units, and The solid non-porous class in which the minimum volume of the voids is purposely enlarged in the new type of solid light concrete I have invented preferably by grading the coarse aggregate and in which more of the larger sized ceramic aggregate is used, or in some cases, globular units of nearly uniform size may be employed to advantage. In the manufacture of globular shot for loading cartridges it is practical to secure a close packing with 27% to 28% voids, and while I have not so far been able to produce aggregates sufficiently uniform to secure less than 32% of voids, I believe my process is adapted to produce a uniformly sized aggregate with as low as 30% voids that would secure a much improved, very light and uniformly strong and non-porous solid waterproof weather resisting surface facing concrete or building structures. In the class of solid concrete a dispersing phase of strong cement mortar is built into a strong trussed and latticed structure to more than entirely fill the voids and to supplement the light aggregate or in some mixtures and gradings the light coarse hollow aggregate made to serve and function largely as a mold forming and economical and desirable ceramic hollow space-filling sub-mould forming element for solid weather-resisting cement mortar concrete structures which would otherwise be too heavy and strong and expensive, and by the use of which hollow waterproof ceramic aggregate solid light concrete structures may be economically made of any desired strength and weight.

Besides these two classes, a third class of improved concrete structures combining the features of both the porous and solid classes in said improved structures, the solid portion forming the outer waterproof, weatherproof and most conspicuous finished portion and the strong and porous class of concrete for the less exposed load-bearing inner portion of the unitary concrete structure or wall sections of concrete; these duplex stuctures may conveniently be made by forming both classes of concrete separately mixed in the same mould the solid finishing surface portion having its voids completely filled with fine aggregate cement mortar deposited first on the bottom of the moulds, and the porous mix filled into the remaining upper portion, and the whole compacted and cured as a unitary mass or improved concrete structure.

The combination of both of the two classes of concrete of my invention made possible by my improved aggregate, as used in both, will find wide application in the building art, as the major portion of light wall-forming material is required for back up and somewhat protected positions in the load bearing walls or the blocks or unit structures of which the walls may be built, and the economy and commercial development of light concrete with light aggregate is and has been closely associated with the porous concrete and because of the peculiar circumstances of the light aggregate concrete in use, such as cinder concrete, its production has been limited to the porous variety.

My improved concrete is and may be especially adapted, by slight modification of the aggregate, highly desirable for both the solid and porous varieties and a combination thereof for the latter of which the solid, strong, outer shell which surrounds the hollow and vesiculated portion may be made very strong and the volume increased, and much of its total strength made to reside in the shells which need only be cemented together in the average of ten and one-half contacting spots per unit, and make the strongest light concrete ever produced with the small amount of cement required.

While for the solid concrete it is not so necessary to secure so much load bearing strength in the shells, although the relative density of the ceramic material of the aggregate shell about 2.56 is less than that of the cement mortar of equal strength which would have a specific gravity of about 2.80, for structural reasons it appears best to rely mostly on the cement mortar strengh in producing the lightest solid concrete of sufficient strength and by designing the partly hollow aggregate to supplement the strength and form space filling and wall forming means to form an impervious waterproof effectively solid artificial concrete rock with sealed cells and the maximum lightness for its intended purpose.

I claim:

1. The process of producing an improved structure of concrete which consists of placing in the bottom of a mold or form a mixture of cement and an aggregate to form solid concrete having solid faces thereon, then placing thereon in the form of a mixture of light partly hollow ceramic aggregate units with strong outer solid shells and less than enough mortar comprised of cement and a fine aggregate to fill the voids in the hollow aggregate but enough to form a strong porous concrete therewith, and curing the combined layers to form a unitary concrete structure combining the advantages of both solid and porous concrete.

2. The method of making light weight, non-solid, fireproof, load bearing concrete from a mixture of hollow, coarse, aggregate units, having solid, strong and waterproof outer shells, with a smaller proportion (only enough to partly fill the interstitial voids in the coarse aggregate) of a mixture of fine aggregate cement and water, to form a strong mortar and said method consisting in cementing the strong shells of the coarse aggregate together at the points of nearest approach and leaving a portion of the interstitial spaces or voids between the coarse aggregate contacting units entirely free from heavy material, thereby securing the maximum strength with the minimum of heavier cement and fine aggregate mortar.

3. A light weight concrete structure which comprises an artificially expanded cellular aggregate bonded together by a cementitious material present in an amount insufficient to fill the voids between the pieces of aggregate.

4. A light weight concrete structure which comprises an artificially expanded cellular aggregate bonded together by a cementitious material present in an amount insufficient to fill the voids between the pieces of aggregate, said structure being covered on at least one surface by a heavier, more dense concrete.

5. A light weight concrete structure which comprises an aggregate the individual pieces of which are cellular but have a strong, hard enclosed shell bonded together by a cementitious material present in an amount insufficient to fill the voids between the pieces of aggregate.

6. A light weight concrete structure which comprises an aggregate the individual pieces of which are cellular but have a strong, hard enclosed shell bonded together by a cementitious material present in an amount insufficient to fill the voids between the pieces of aggregate, said structure being covered on at least one surface by a heavier, more dense concrete.

7. A light weight concrete structure which comprises an aggregate the individual pieces of which are cellular but have a strong, hard enclosed shell bonded together by a cementitious material present in an amount insufficient to fill the voids between the pieces of aggregate, said structure being covered on at least one surface by a heavier, more dense concrete, which concrete comprises a cellular aggregate having a relatively light outer shell and a bonding material that is present in a quantity which is at least sufficient to fill all of the spaces between the individual pieces of aggregate.

CHARLES KNOX HARDING.